Sept. 10, 1957 F. WEINDEL, JR 2,805,832
EMBLEM ATTACHING MEANS
Filed Jan. 21, 1954
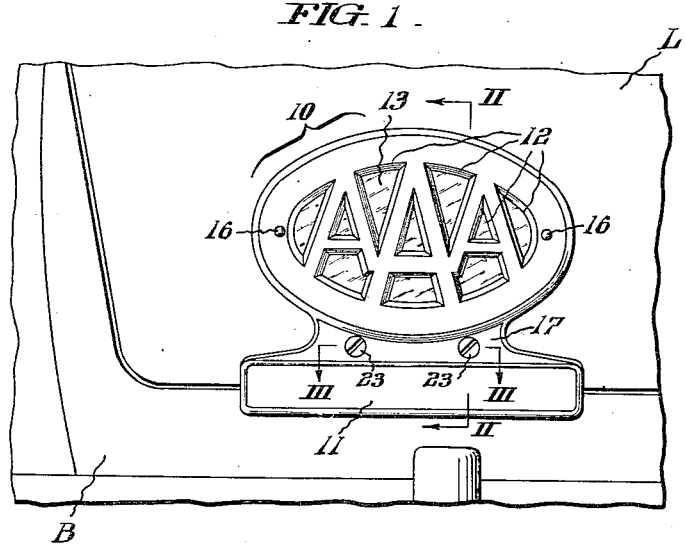
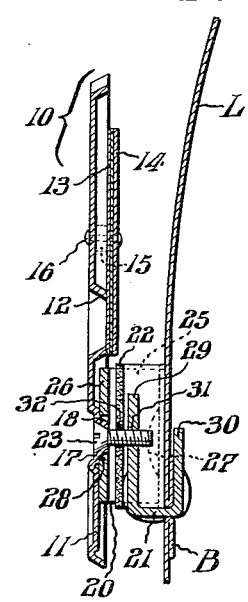
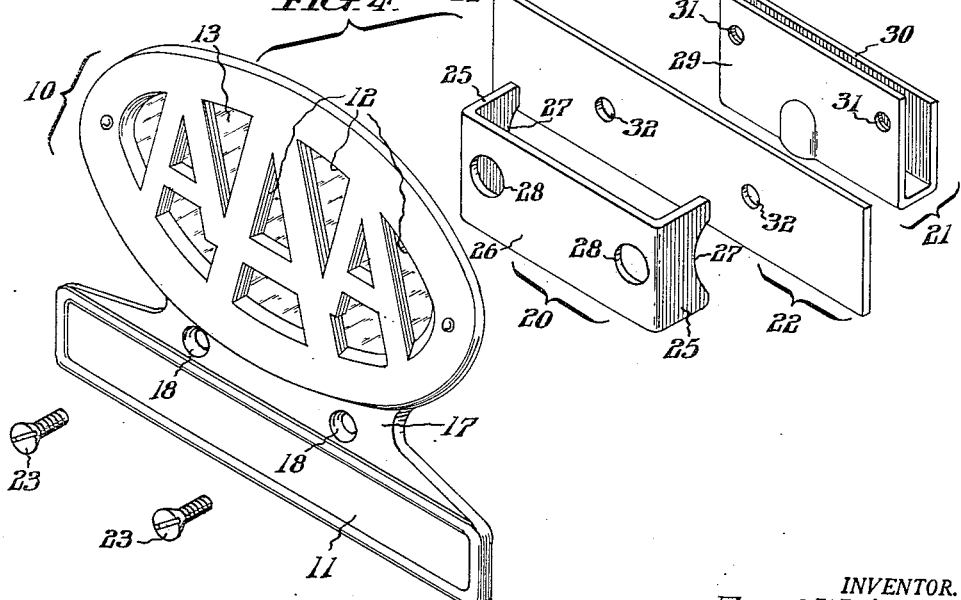
INVENTOR.
Fred Weindel Jr,
BY Paul & Paul
ATTORNEYS.

United States Patent Office 2,805,832
Patented Sept. 10, 1957

2,805,832

EMBLEM ATTACHING MEANS

Fred Weindel, Jr., Allentown, Pa., assignor to L. F. Grammes & Sons, Inc., Allentown, Pa., a corporation of Pennsylvania Application January 21, 1954, Serial No. 405,407

3 Claims. (Cl. 248—226)

This invention relates to emblem attaching means. More specifically, it is concerned with means for securing club emblems and the like to automobiles or other conveyances.

The chief aim of my invention is to provide an emblem attaching means for the aforementioned purpose, which is simple in construction; which lends itself to expeditious production in quantity at small cost; and which, moreover, is easily and quickly secured to or removed from the conveyances.

Other objects and attendant advantages will appear from the following detailed description of the attached drawings, wherein:

Fig. 1 is a fragmentary view showing the rear end of an automobile with an emblem secured to the bottom edge of the trunk lid by attaching means conveniently embodying my invention.

Fig. 2 is a fragmentary view in vertical section taken as indicated by the angled arrows II—II in Fig. 1.

Fig. 3 is a fragmentary view in vertical section taken as indicated by the angled arrows III—III in Fig. 1; and Fig. 4 is an exploded view in perspective showing the component parts of the attaching means juxtaposed in the order in which they are assembled.

The emblem herein shown by way of example and comprehensively designated by the numeral 10, is stamped from sheet metal, the same being embossed and of elliptic configuration and having a horizontally elongate cross bar 11 at the bottom thereof. The elliptic portion of the emblem 10 is formed with letter defining cut-outs 12 through which a luminous reflecting surface 13 on a backing plate 14 is visible, said plate being secured adjacent opposite ends to the emblem, with interposition of spacers 15, by means of rivets 16. For a purpose which will be understood presently, the emblem is provided in the medial portion 17 thereof, see Fig. 4, with a pair of laterally-spaced countersunk holes 18.

The improved means which I have devised for attaching an emblem such as above described, includes a pair of opposing bar-like clamp components 20 and 21 both of which are fashioned in practice from suitably stiff and relatively stout plate metal; a length 22 of strip felt or the like; and a pair of filister head securing screws 23. The end portions 25 of the component 20 are directed at right angles from the main or cross portion 26 and are bighted as at 27, and said cross portion is provided with two laterally-spaced holes corresponding to the holes 18 in the emblem 10. The bar component 21 is in the form of a relatively wide channel with longitudinal flanges 29 and 30 of which the former is somewhat higher than the latter and is provided adjacent its top edge with tapped holes 31 likewise spaced to correspond with the holes 18 in the emblem 10. The channel component 21 is slightly shorter as to length than the component 20 for capacity of its frontal flange 30 to be bridged by said component 20 in assembly therewith as shown in Fig. 3. The felt strip 22 is considerably longer than the bridging component 20 and provided in its longitudinal median with holes 32 which are symmetrically disposed and spaced, in turn, like the holes 18 in the emblem 10.

In preparation for marketing or distribution, the several parts of the device are pre-assembled at the factory, i. e., the shanks of the screws 23 are first passed through the holes 18 of the emblem 10, then successively through the holes 28 and 32, respectively, in the component 20 and in the felt strip 22, and finally threadedly engaged into the tapped holes 31 in the frontal flange 29 of the component 21. Incident to assembling, the free end portions of the felt strip 22 are drawn over the edges of the side projections 25 of the component 20 in a manner which will be readily understood. With the device so prepared and loosely assembled, the channeled component 21 is hooked upwardly about the bottom edge of the trunk lid L on the body B of the automobile as in Fig. 2. After placement of the device as just explained, the screws 23 are drawn up tight, with the result that the rear flange 30 of the channel component 21 is brought into clamping engagement with the interior face of the lid L and the side portions 25 of the bridging component 20 are brought into clamping engagement with the exterior surface of the lid as in Figs. 2 and 3. Due to interposition of the end portions of the felt strip 22 between the ends of the bridging component and the exterior surface of the lid, the finish on said surface is protected against being scratched or otherwise marred.

The grip of the fastening means is rendered all the more secure by reason of the bighting of the side portions of the bridging component at 27 and the use of the two draw screws 23.

It is to be understood that I do not consider myself limited to the precise details of construction herein shown and described by way of example since various modifications are obviously possible within the scope of the broader of the appended claims. Furthermore the expression "emblem" as used in the claims is to be regarded as comprehensive of other objects for which my improved attaching means can be readily employed.

Having thus described my invention, I claim:

1. Means for attaching a club emblem or the like in the form of a plate having a pair of transversely spaced holes adjacent the bottom edge thereof to the trunk lid of an automobile, said means comprising an elongate channel section clamp component adapted to be engaged, with provision for crosswise clearance, upwardly about the bottom edge of the trunk lid and having in its outer flange a pair of tapped apertures registrable respectively with the holes in the emblem; a somewhat longer cooperative clamp component adapted to bridge the channeled clamp member and having inwardly-directed end portions to bear against the exterior face of the trunk lid, and also having clearance holes registrable respectively with the holes in the emblem and with the threaded apertures in the outer flange of the channelled clamp component; and a pair of headed draw screws with their shanks passed freely through the registering holes respectively in the emblem and in the bridging clamp component and threadedly engaged in the tapped apertures in the flange of the channeled clamp component to secure the emblem with the back thereof against the bridging clamp component.

2. The invention according to claim 1, further including protective material of felt or the like surrounding the inwardly-directed end portions of the bridging clamp component to prevent marring of the exterior surface finish of the trunk lid.

3. The invention according to claim 1, further including a strip component of cushioning material, such as felt or the like, interposed between the outer flange of the channel section component and the bridging component, said strip having clearance holes for the shanks of the securing screws and having the end portions thereof lapped about the inwardly-directed end portions of said bridging component to prevent marring of the exterior surface finish of the trunk lid.

References Cited in the file of this patent

UNITED STATES PATENTS

| | | |
|---|---|---|
| 2,214,302 | Keller et al. | Sept. 10, 1940 |
| 2,259,779 | Romig | Oct. 21, 1941 |
| 2,321,251 | Sauer | June 8, 1943 |
| 2,322,798 | Fischer | June 29, 1943 |